April 17, 1928.
W. L. MARDEN
DIAL INDICATOR FOR GASOLINE PUMPS, ETC
Filed Jan. 26, 1927
1,666,100
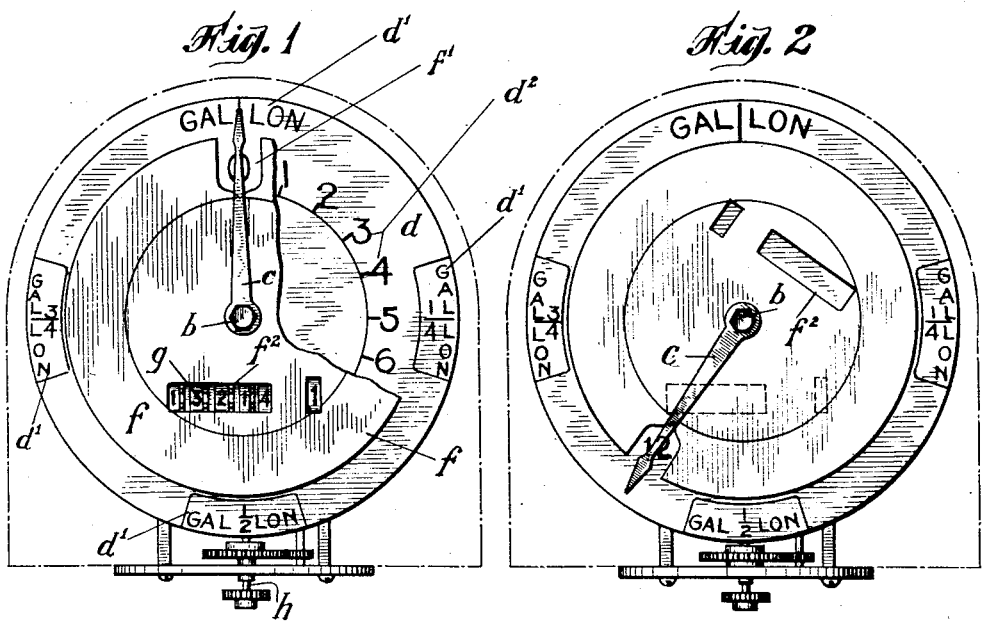
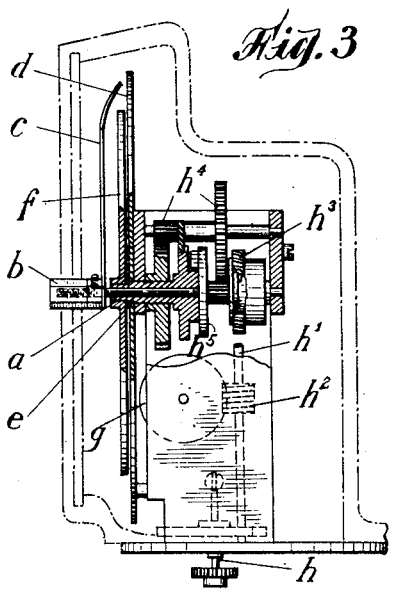
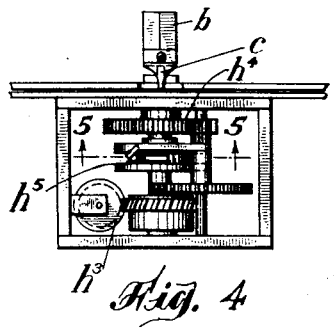
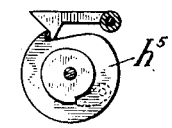
Inventor
William L. Marden
By his Attorneys
Redding, Greeley, O'Shea Campbell Patented Apr. 17, 1928.

1,666,100

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

DIAL INDICATOR FOR GASOLINE PUMPS, ETC.

Application filed January 26, 1927. Serial No. 163,825.

Many gasoline filling stations for automobiles are equipped with dial indicators, operatively associated with the pump or other delivery device, for the purpose of indicating to the customer the quantity of gasoline delivered to him. Ordinarily such an indicator has a dial with two concentric rows of figures, indicating respectively fractions of a gallon and multiples of a gallon, and two pointers of different lengths, like the hands of a clock, for coaction with the two rows of figures respectively. Practical use of such indicators has shown that disputes often arise between the vendor and the customer by reason of confusion, particularly on the part of the customer, between the two concentric rows of figures. It sometimes happens that the vendor takes advantage of the failure of the customer to read the dial accurately to cheat the customer as to the quantity of gasoline delivered. Moreover in such indicators the totalizing register is disclosed during the operation of the station through a sight opening in the dial, whereas experience has shown that to secure honest service it is desirable that the totalizing register should be concealed from view during the operation of the station. It is the object of the present invention to overcome these difficulties in the operation of filling stations without requiring substantial change in the mechanism provided for the operation of the indicator and in accordance with the invention a single hand or pointer is provided for coaction with one row of figures, such as the figures which show fractions of a gallon, and a rotatable, notched disc is provided for coaction with the inner row of figures, such as those which indicate multiples of a gallon. Thereby the two rows of figures are clearly differentiated to the customer and the liability of confusion or dishonest practice is reduced. Moreover, the rotating disc is provided with a sight opening through which the totalizing register is visible only when the disc and therefore the pointer have been reset to the zero position.

The invention will be more fully explained hereinafter with reference to the accompanying drawings in which it is illustrated and in which:

Figure 1 is a view in front elevation of a dial indicator and some of its associated parts, the rotatable notched disc being broken out to show the figures behind it and the parts being shown in their initial or zero positions.

Figure 2 is a view generally similar to Figure 1, but with the rotatable disc and the pointer in other than zero positions.

Figure 3 is a view in sectional elevation, on a plane at right angles to that of Figures 1 and 2, showing so much of an actuating mechanism as is necessary to enable the invention to be understood.

Figure 4 is a partial view of the parts shown in Figure 3 as seen from above.

Figure 5 is a detail view in sectional elevation on the plane of section indicated by the broken line 5—5 of Figure 4.

In the embodiment of the invention shown, a central shaft $a$, provided with a knob $b$ for resetting, carries a pointer $c$, like the hand of a clock, for coaction with the outer row of figures or quantity designations $d^1$ on a fixed dial $d$, which also bears an inner, concentric row of figures $d^2$, to indicate multiples of gallons. Concentric with the shaft $a$ is a sleeve shaft $e$, to which is secured, in front of the dial $d$, so as to rotate with the sleeve shaft $e$, a disc $f$, the periphery of which is within the row of quantity designations $d^1$, while the disc is notched, as at $f^1$, to disclose, one at a time, the figures of the inner row $d^2$. The disc $f$ is further provided with a sight opening $f^2$ which is so placed with reference to the notch $f^1$ that the usual totalizing register $g$ will be disclosed through the opening $f^2$ only when the disc $f$ and the pointer $c$ have been reset to initial or zero position, as shown in Figure 1, the totalizing register being at all other times concealed from view, as represented in Figure 2.

Any suitable mechanism for actuating the pointer $c$ and the notched disc $f$ and for enabling the pointer and the disc to be reset to initial or zero position after each operation through manipulation of the resetting knob $b$, may be employed. A suitable mechanism for the purpose is illustrated in the drawings and is shown and described in detail in Letters Patent of the United States No. 1,617,406, dated February 15, 1927, and need not be described in detail herein. In such mechanism a shaft $h$, operatively associated with the pump mechanism, is geared to a vertical shaft $h^1$ which drives the totalizing register $g$ through a worm and worm gear indicated at $h^2$ and, through a worm and worm gear shown at $h^3$, actuates the train of gearing $h^4$ by which the pointer $c$ and the notched disc $f$ are differentially driven, such train of gearing including stop discs and coacting pawls as indicated generally at $h^5$, whereby, after each operation, through manipulation of the resetting knob $b$, the pointer $c$ and rotatable disc $f$ may be reset to initial or zero position without affecting the totalizing register $g$.

I claim as my invention:

In a dial indicator for gasoline pumps, the combination of a fixed dial having thereon two concentric rows of figures of different denominations, a pointer for coaction with the outer row of figures, a rotatable notched dial concentric with the pointer and arranged to disclose through the notch one at a time the figures of the inner row, said disc having also a sight opening, a totalizing register disclosed through the sight opening in the disc when the disc is in zero position, and means to actuate the pointer and the disc, whereby the totalizing register is concealed during operation of the pump.

This specification signed this 24 day of Jan. A. D. 1927.

WILLIAM L. MARDEN.